(12) United States Patent
Santiago et al.

(10) Patent No.: US 9,926,973 B2
(45) Date of Patent: Mar. 27, 2018

(54) AIR BEARING-CORRUGATED THRUST BEARING DISC

(71) Applicant: HAMILTON SUNDSTRAND CORPORATION, Windsor Locks, CT (US)

(72) Inventors: Anthony Santiago, Simsbury, CT (US); Jeffery L. Stark, Niantic, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 0 days.

(21) Appl. No.: 15/180,686

(22) Filed: Jun. 13, 2016

(65) Prior Publication Data

US 2017/0356490 A1 Dec. 14, 2017

(51) Int. Cl.
*F16C 17/04* (2006.01)
*F16C 43/02* (2006.01)

(52) U.S. Cl.
CPC ............ *F16C 17/042* (2013.01); *F16C 43/02* (2013.01); *F16C 2226/12* (2013.01); *F16C 2326/43* (2013.01)

(58) Field of Classification Search
CPC .................................................... F16C 17/042
See application file for complete search history.

(56) References Cited

U.S. PATENT DOCUMENTS

| | | | | |
|---|---|---|---|---|
| 4,247,155 A * | 1/1981 | Fortmann | ............. | F16C 17/024 384/124 |
| 4,682,900 A * | 7/1987 | Gu | ........................ | F16C 17/042 384/105 |
| 5,110,220 A * | 5/1992 | Gu | ........................ | F16C 17/042 384/103 |
| 5,248,205 A * | 9/1993 | Gu | ........................ | F16C 17/042 384/106 |
| 5,318,366 A * | 6/1994 | Nadjafi | ................... | F16C 27/02 384/105 |
| 5,540,505 A | 7/1996 | Struziak | | |
| 5,743,654 A | 4/1998 | Ide et al. | | |
| 5,938,341 A * | 8/1999 | Eccles | ..................... | F16C 27/08 384/105 |
| 6,158,892 A | 12/2000 | Stewart et al. | | |
| 6,752,533 B2 | 6/2004 | Saville et al. | | |
| 9,151,322 B2 * | 10/2015 | Heshmat | ............... | F16C 17/042 |
| 9,175,722 B1 | 11/2015 | Park et al. | | |

(Continued)

FOREIGN PATENT DOCUMENTS

| | | |
|---|---|---|
| CN | 103341553 B | 8/2015 |
| EP | 2740951 A1 | 6/2014 |
| JP | 3636328 B1 | 4/2005 |

OTHER PUBLICATIONS

European Search Report for Application No. 17175680.2-1751 dated Oct. 25, 2017, 7 pages.

*Primary Examiner* — Thomas R Hannon
(74) *Attorney, Agent, or Firm* — Cantor Colburn LLP

(57) ABSTRACT

A thrust disc for an aircraft and methods of making and using the thrust disc are provided. The thrust disc includes a planar body, and a region unitarily formed from a portion of the body, wherein the region has a plurality of sides defining the region on the planar body, wherein the region has a textured feature, and wherein a subset of the plurality of sides are cut and at least one of the plurality of sides is integrally connected to the body.

15 Claims, 5 Drawing Sheets

(56) References Cited

U.S. PATENT DOCUMENTS

| 9,222,509 | B2 | 12/2015 | Swanson et al. |
| 2014/0376844 | A1 | 12/2014 | Swanson et al. |
| 2015/0030270 | A1 | 1/2015 | Heshmat |
| 2015/0330443 | A1 | 11/2015 | Omori |

* cited by examiner

AIR BEARING-CORRUGATED THRUST BEARING DISC

BACKGROUND

The subject matter disclosed herein generally relates to thrust discs and, more particularly, to the elements of the thrust discs' and how those items are manufactured and used.

In one or more aircrafts, fluid film hydrodynamic thrust bearings are used to support the rotating element in air cycle machines. These thrust bearings are typically composed of three components that include a coated top foil, a corrugated "bump" foil, and a "thrust" disc. Typically a thrust bearing is assembled by welding multiple sets of top and "bump" foils to the thrust disc. In order to achieve the assembly precise fixturing and tooling are required to accurately locate the foils radially and circumferentially on the thrust disc prior to welding. This fixturing and welding equipment is costly and may require replacement over time. Further, in the process of welding, the thrust disc may become warped due to the localized heating of the thrust disc during the welding process. This may be compounded due to amount of individual welds required per foil set and the relatively thin material that comprises the thrust bearing disc.

Accordingly, there is a need to provide a system and method for improving thrust disc design, manufacturing, and use performance.

BRIEF DESCRIPTION

According to one embodiment a thrust disc for an aircraft is provided. The thrust disc includes a planar body, and a region unitarily formed from a portion of the body, wherein the region has a plurality of sides defining the region on the planar body, wherein the region has a textured feature, and wherein a subset of the plurality of sides are cut and at least one of the plurality of sides is integrally connected to the body.

In addition to one or more of the features described above, or as an alternative, further embodiments may include wherein the textured feature is corrugated.

In addition to one or more of the features described above, or as an alternative, further embodiments may include wherein the textured feature is one selected from a group consisting of a symmetrical bump pattern, an asymmetric bump pattern, and a wrinkled pattern.

In addition to one or more of the features described above, or as an alternative, further embodiments may include wherein the region is a trapezoid, wherein the parallel sides of the trapezoid are curved, and wherein at least one of the non-parallel sides is integrally connected to the body.

In addition to one or more of the features described above, or as an alternative, further embodiments may include wherein the region is one selected from a group consisting of a triangular shape, a crescent shape, a rectangular shape, a kite shape, a square shape, a circle shape, an oval shape, a regular polygon shape, an irregular polygon shape, a pentagon shape, a hexagon shape, a heptagon, and an octagon shape.

In addition to one or more of the features described above, or as an alternative, further embodiments may include wherein the thrust disc further includes a plurality of regions formed from a plurality of different portions of the body, wherein the plurality of regions each have a textured feature.

In addition to one or more of the features described above, or as an alternative, further embodiments may include wherein the each of the plurality of regions has a different shape.

In addition to one or more of the features described above, or as an alternative, further embodiments may include, wherein each of the plurality of regions has a same shape.

In addition to one or more of the features described above, or as an alternative, further embodiments may include, wherein each of the plurality of regions has a different textured feature.

In addition to one or more of the features described above, or as an alternative, further embodiments may include, wherein each of the plurality of regions has a same textured feature.

According to one embodiment a method of manufacturing a thrust disc is provided. The method includes providing a planar disc, cutting along a subset of sides of a region on the planar disc, wherein at least one of the plurality of sides of the region is uncut and integrally connected to the planar disc, and pressing a textured feature into the region.

In addition to one or more of the features described above, or as an alternative, further embodiments may include wherein pressing the textured feature into the region further include pressing a corrugated pattern into the region using a hydraulic press.

In addition to one or more of the features described above, or as an alternative, further embodiments may include wherein pressing the textured feature into the region further include selecting the textured feature from a group consisting of a symmetrical bump pattern, an asymmetric bump pattern, and a wrinkled pattern, and pressing the selected textured feature into the region using a hydraulic press.

In addition to one or more of the features described above, or as an alternative, further embodiments may include wherein cutting further includes cutting to form a trapezoid by cutting the curved parallel sides and at least one of the non-parallel sides.

In addition to one or more of the features described above, or as an alternative, further embodiments may include wherein cutting further includes cutting to form one selected from a group consisting of a triangular shape, a crescent shape, a rectangular shape, a kite shape, a square shape, a circle shape, an oval shape, a regular polygon shape, an irregular polygon shape, a pentagon shape, a hexagon shape, a heptagon, and an octagon shape.

In addition to one or more of the features described above, or as an alternative, further embodiments may include further include cutting along a second subset of sides of a second region on the planar disc, wherein at least one of the plurality of second sides of the second region is uncut and integrally connected to the planar disc, and pressing a second textured feature into the second region.

In addition to one or more of the features described above, or as an alternative, further embodiments may include, wherein the first region and the second region have different shapes.

In addition to one or more of the features described above, or as an alternative, further embodiments may include, wherein the first region and the second region have a same shape.

According to one embodiment a method of using a thrust disc for an aircraft is provided. The method includes providing a thrust input, and engaging the thrust disc based on the provided thrust input. The thrust disc includes a planar body, and a region unitarily formed from a portion of the body, wherein the region has a plurality of sides defining the region on the planar body, wherein the region has a textured feature, and wherein a subset of the plurality of sides are cut and at least one of the plurality of sides is integrally connected to the body.

In addition to one or more of the features described above, or as an alternative, further embodiments may include wherein the thrust disc includes a plurality of regions formed from a plurality of different portions of the planar body.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The foregoing and other features, and advantages of the present disclosure are apparent from the following detailed description taken in conjunction with the accompanying drawings in which.

DETAILED DESCRIPTION

Figure 1:
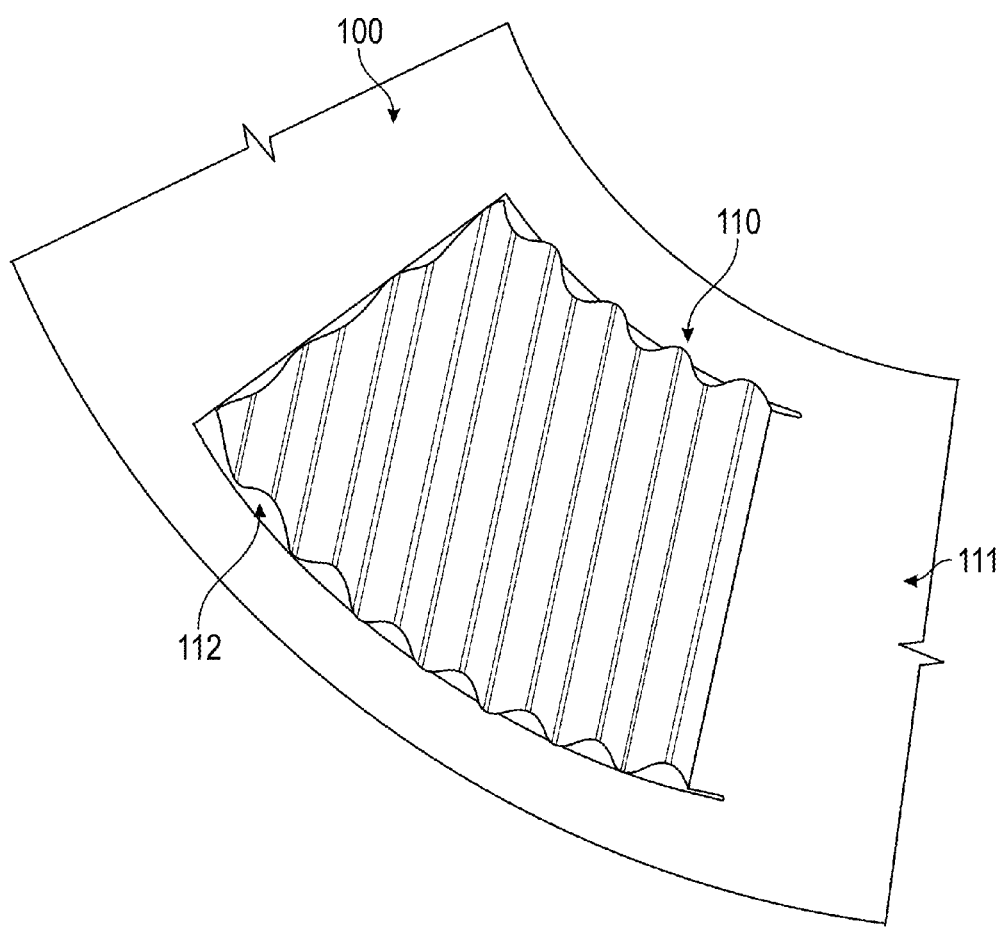
FIG. 1 depicts a portion of a thrust disc showing a region in accordance with one or more embodiments of the present disclosure.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

One or more embodiments are directed toward a thrust bearing that consists of a thrust disc that is constructed from a single piece of material that includes one or more regions having a corrugated "bump foil" multi-pad configuration.

According to one or more embodiments, a thrust bearing configuration has one thrust bearing with as many as nine individual bump pads per disc. Traditionally, each bump foil pad requires multiple welds along a formed flat tab located on one end of the "bump" foil. The manufacturing process required to weld accurately in a relative small space envelope is a time consuming process which requires precise tooling and tightly controlled processing. Further issues at weld can cause excessively high distortion of the bearing disc. Also, poor weld quality can cause weld nugget expulsion during machine operation and ultimately lead to machine operation failure Accordingly, one or more embodiments as disclosed herein include a thrust disc with a segmented design. Particularly, unformed pads are created by a blanking or similar cold working process. The pad would then be corrugated to meet the required final form.

Turning now to the figures, FIG. 1 depicts a portion of a thrust disc 100 showing a region 110 in accordance with one or more embodiments of the present disclosure. The region 110 has a substantially trapezoidal shape. The parallel sides of the trapezoidal shaped region 110 are curved to match the curve of the thrust disc 100. Further, the dimensions of the region 110 are defined by the plurality of sides of the region of which a subset of sides 112 are cut. The remaining side 111 is not cut and remains integrally connected to the thrust disc 100. Accordingly, the region 110 can then be formed to include a textured feature. Specifically, as shown, the region 110 can be bent providing the region 110 with a corrugated textured feature. According to another embodiment, the corrugated pattern can be adjusted by providing different amplitude and frequency values for the corrugated pattern. Further, according to another embodiment, the corrugated pattern can be pressed into the region perpendicular to the shown direction in FIG. 1 or, in accordance with one or more embodiments, the corrugated pattern wave direction can be provided anywhere there between.

Figure 2A:
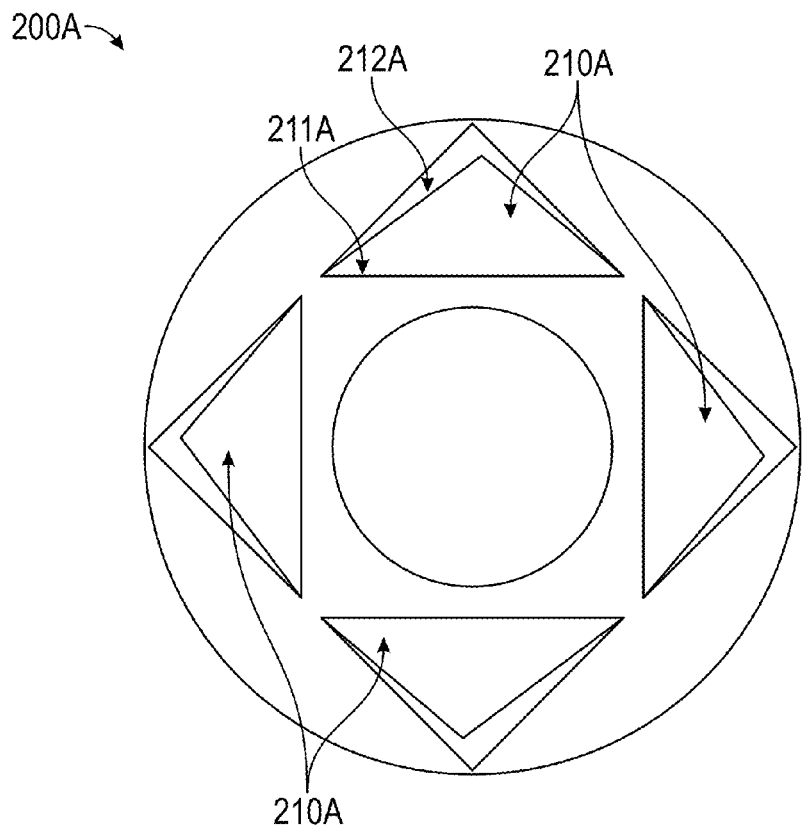
FIG. 2A depicts a thrust disc with triangle regions in a first arrangement on the planar body of the thrust disc in accordance with one or more embodiments of the present disclosure.

FIG. 2A depicts a thrust disc 200A with triangle regions 210A in a first arrangement on the planar body of the thrust disc 200A in accordance with one or more embodiments of the present disclosure. As shown, the regions 210A can be arranged such that the attached edge 211A of each region 210A faces the center of the thrust disc 200A. Accordingly, the cut sides 212A can be provided on the sides facing toward the outer edge of the thrust disc 200A. Alternatively, according to another embodiment, the attached edge 211A can be either of the other sides of the triangular shaped region 210A. Further, each triangular shaped region 210A is bent and provided with a textured feature. As shown, each region 210A is pressed with the same textured feature. According to other embodiments, at least one or each region 210A could be provided with a different textured feature.

Figure 2B:
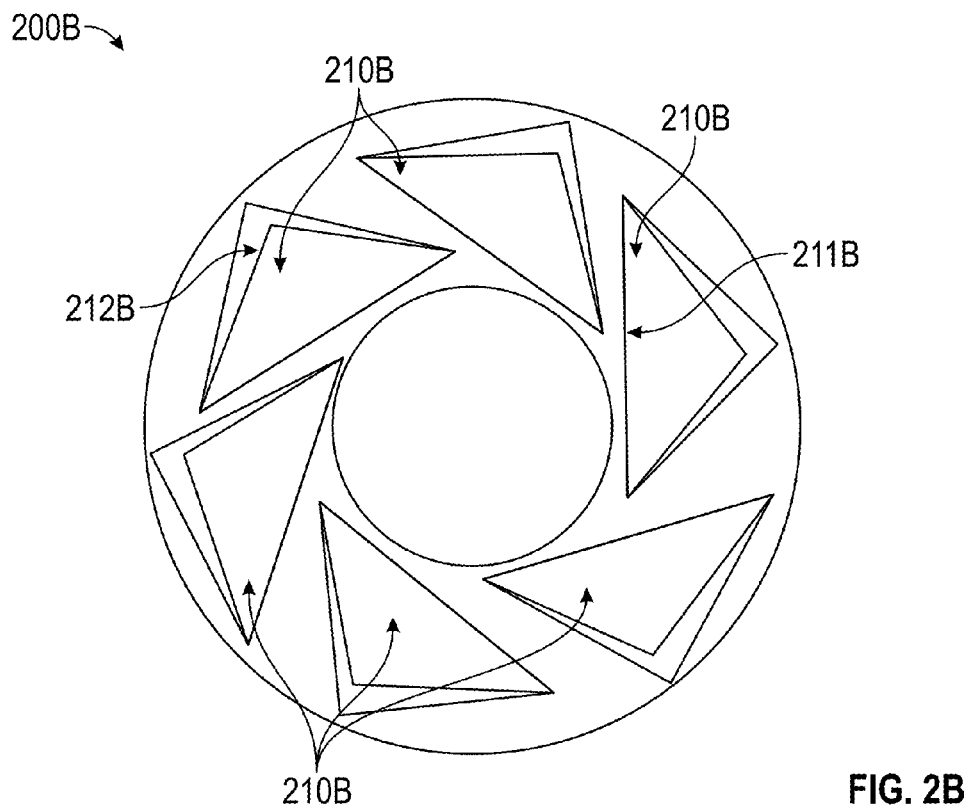
FIG. 2B depicts a thrust disc with triangle regions in a second arrangement on the planar body of the thrust disc in accordance with one or more embodiments of the present disclosure.

FIG. 2B depicts a thrust disc 200B with triangle regions 210B in a second arrangement on the planar body of the thrust disc 200B in accordance with one or more embodiments of the present disclosure. As shown, the regions 210B can be arranged such that the attached edge 211B of each region 210B substantially faces the center of the thrust disc 200B with a slight shift to allow space for additional regions 210B being included. Accordingly, the cut sides 212B can be provided on the sides facing toward the outer edge of the thrust disc 200B. Alternatively, according to another embodiment, the attached edge 211B can be either of the other sides of the triangular shaped region 210B. Further, each triangular shaped region 210B is bent and provided with a textured feature. As shown, each region 210B is pressed with the same textured feature. According to other embodiments, at least one or each region 210B could be provided with a different textured feature.

Figure 3:
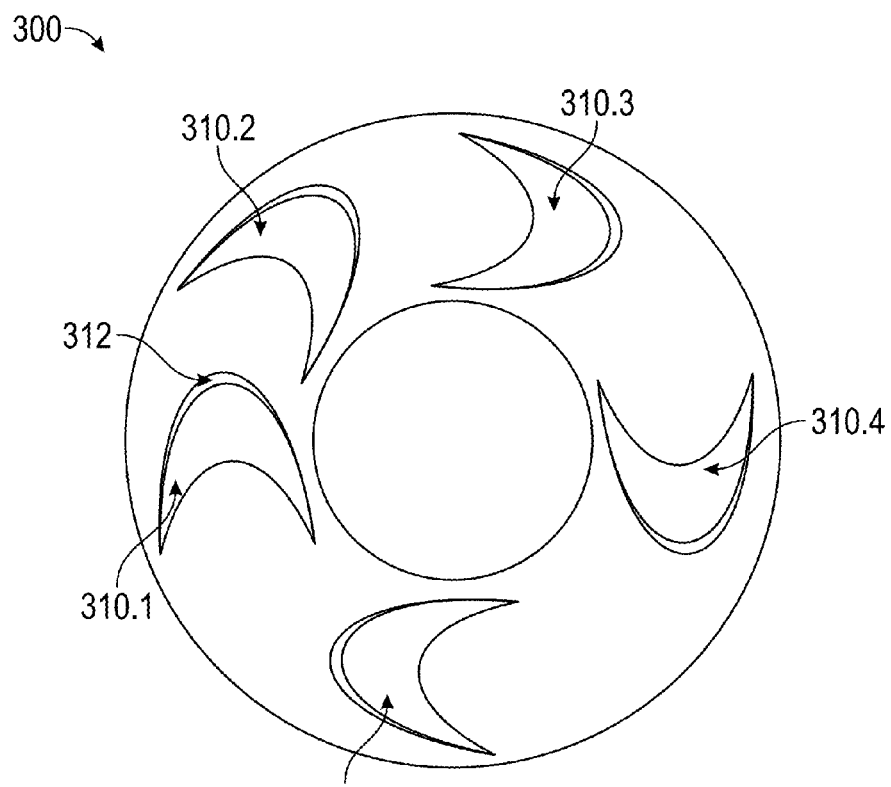
FIG. 3 depicts a thrust disc with crescent regions in accordance with one or more embodiments of the present disclosure.

FIG. 3 depicts a thrust disc 300 with crescent regions 310.1 through 310.5 in accordance with one or more embodiments of the present disclosure. As shown a first region 310.1 is provided with a front cut edge 312 with the attached surface behind. The region 310.1 is pressed with a textured feature helping define the crescent shape. According to another embodiment, a textured feature could be pressed that changes the sides and therefore the shape of the region 310.1. Further, as shown each region 310.1-310.5 are provided with the same textured feature. According to another embodiment each region 310.1-310.5 can be provided with a textured feature completely independent and different from the other regions. Further, as shown, each region 310.1-310.5 can be spaced at differing intervals from each other. For example, as shown, region 310.1 is provided with a smaller distance from 310.2 as compared to the distance between 310.2 and 310.3. Similarly, the distance increases for each subsequent region. According to another embodiment, equal spacing can be provided. Further, according to another embodiment, the dimension of each region 310.1-310.5 can be different as well as the shape.

Figure 4:
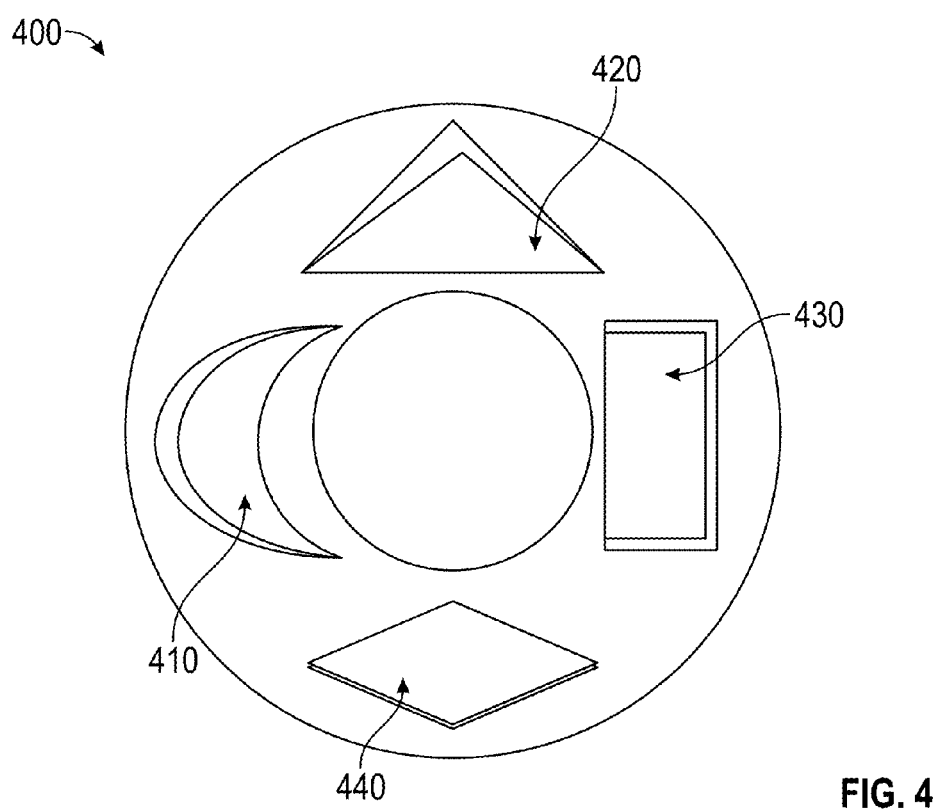
FIG. 4 depicts a thrust disc with a plurality of different shaped regions in accordance with one or more embodiments of the present disclosure.

For example, FIG. 4 depicts a thrust disc 400 with a plurality of different shaped regions 410, 420, 430, and 440 in accordance with one or more embodiments of the present disclosure. Specifically, the thrust disc 400 includes a crescent shaped region 410, a triangle shaped region 420, a rectangular shaped region 430, and a kite shaped region 440. According to other embodiments, the thrust disc 400 can include other shapes. Each region 410, 420, 430, and 440 has a subset of sides that are cut while retaining at least one side that is integrally attached to the thrust disc 400. As shown, although reach region 410, 420, 430, and 440 have differing shapes, each region 410, 420, 430, and 440 is provided with the same textured feature. According to another embodiment, one or more of the regions 410, 420, 430, and 440 can be provided with a different textured feature.

Figure 5:
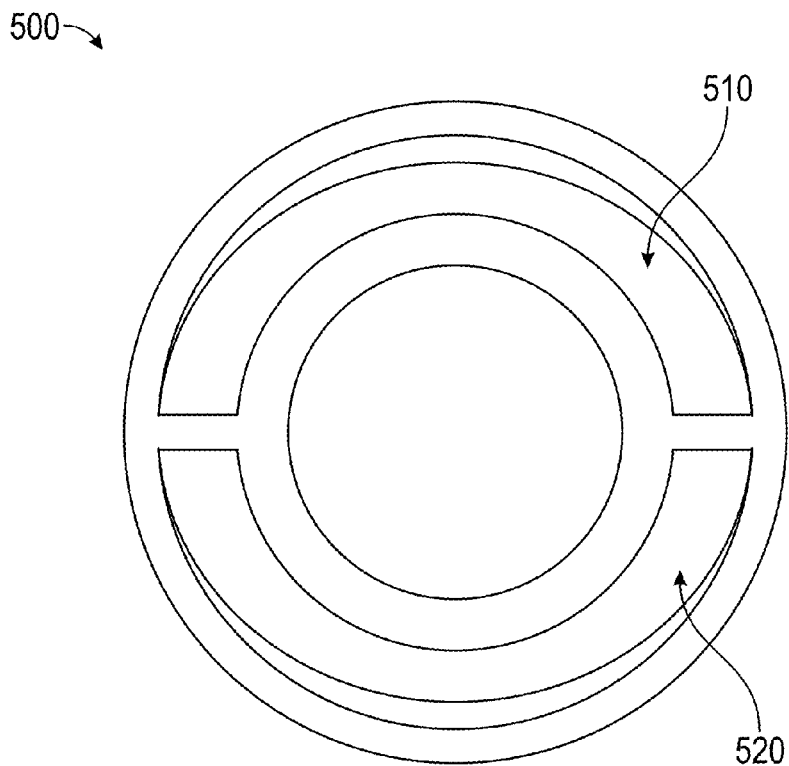
FIG. 5 depicts a thrust disc with two regions, each with a different textured feature in accordance with one or more embodiments of the present disclosure.

For example, FIG. 5 depicts a thrust disc 500 with two regions 510 and 520, each with a different textured feature in accordance with one or more embodiments of the present disclosure. Specifically, as shown a first region 510 is provided with a dotted texture feature. Further, the second region 520 is provided with a random wrinkled pattern for a textured feature. Alternatively, according to other embodiments, either of the regions 510 and/or 520 can be provided with an alternative textured feature. Further, according to another embodiment, a region 510 and/or 520 can be provided with a mix of different textured features. For example a region could be provided with a wrinkled pattern along the edges and an organized dotted pattern in the central portion of the region. Alternatively, according to another embodiment, a region could be provided with alternating strips that have different textured features for each strip.

Figure 6:
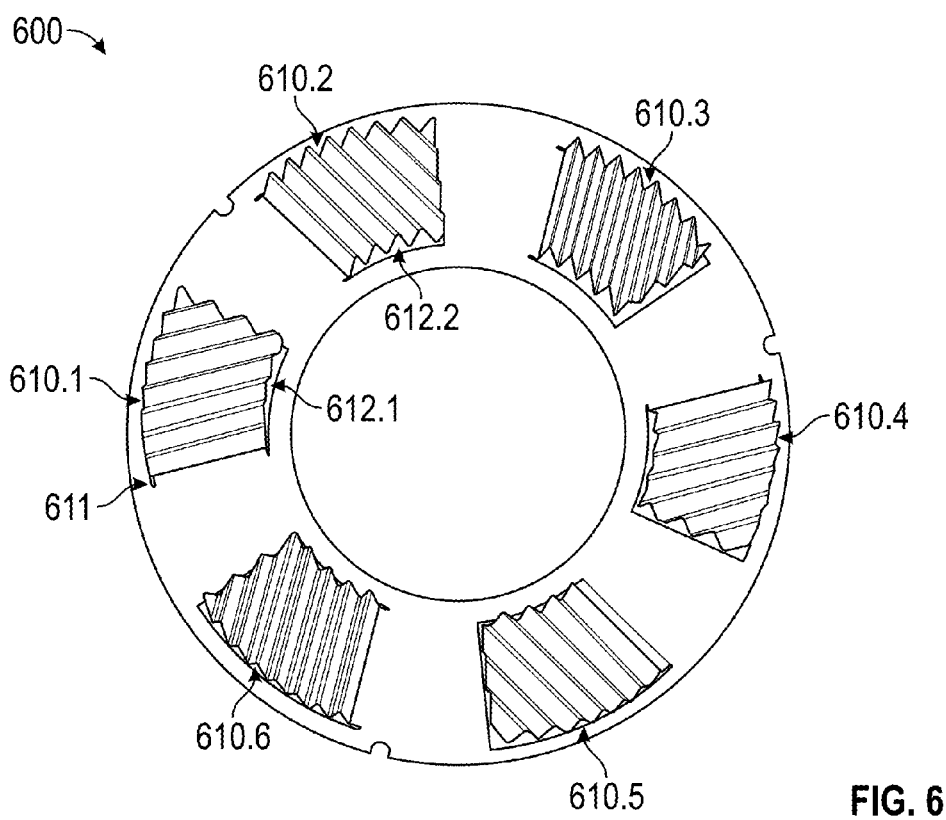
FIG. 6 depicts a thrust disc with a plurality of trapezoidal regions that each include a corrugated textured feature in accordance with one or more embodiments of the present disclosure.

FIG. 6 depicts a thrust disc 600 with a plurality of trapezoidal regions 610.1-610.6 that each includes a corrugated textured feature in accordance with one or more embodiments of the present disclosure. Specifically, thrust disc 600 includes six evenly spaced regions 610.1-610.6. Each region 610.1-610.6 is provided with a corrugated pattern for the textured feature. Further, as shown, a front leading edge 611 of each region 610.1-610.6 remains integrally formed with the body of the thrust disc 600. Further, the remaining sides, for example 612.1 and 612.2, of the regions 610.1-610.6 are cut along freeing the regions 610.1-610.6 partially from the thrust disc 600.

Figure 7:
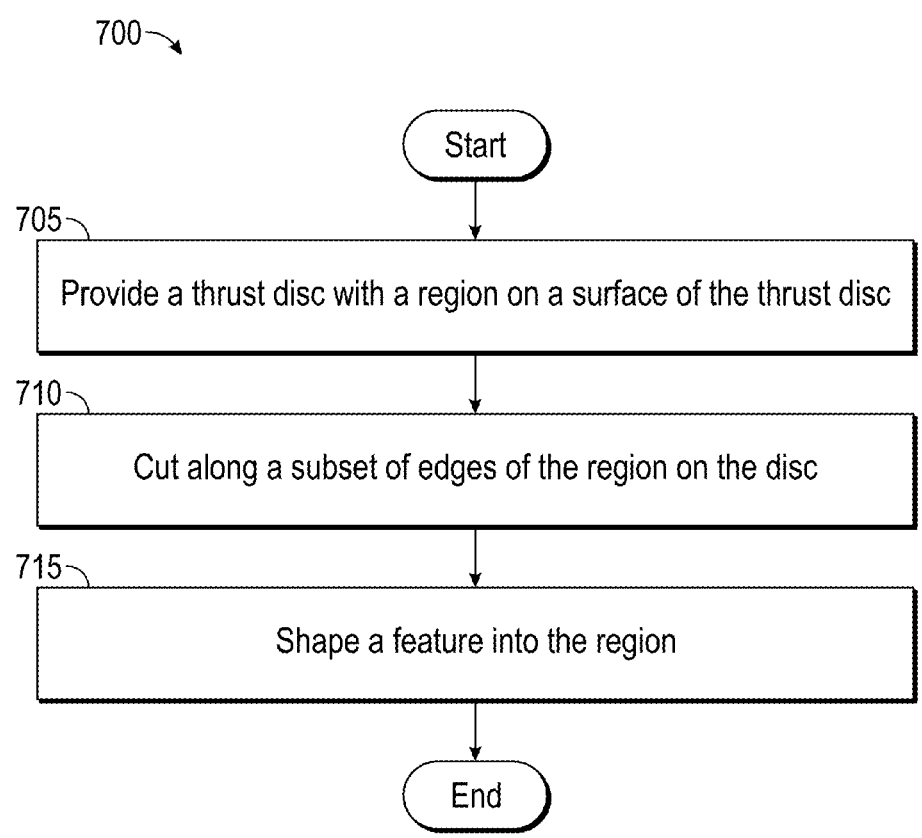
FIG. 7 depicts a flowchart of a method of manufacturing a thrust disc in accordance with one or more embodiments of the present disclosure.

FIG. 7 depicts a flowchart of a method 700 of manufacturing a thrust disc in accordance with one or more embodiments of the present disclosure. The method 700 includes providing a planar disc (operation 705). Further, the method includes cutting along a subset of sides of a region on the planar disc, wherein at least one of the plurality of sides of the region is uncut and integrally connected to the planar disc (operation 710). Finally, the method 700 includes pressing a textured feature into the region (operation 715).

According to an embodiment, pressing the textured feature into the region can further include pressing a corrugated pattern into the region using a hydraulic press. According to another embodiment pressing the textured feature into the region can further include selecting the textured feature from a group consisting of a symmetrical bump pattern, an asymmetric bump pattern, and a wrinkled pattern, and pressing the selected textured feature into the region using a hydraulic press.

Further, according to another embodiment, cutting further includes cutting to form a trapezoid by cutting the curved parallel sides and at least one of the non-parallel sides. According to another embodiment, cutting further includes cutting to form one selected from a group consisting of a triangular shape, a crescent shape, a rectangular shape, a kite shape, a square shape, a circle shape, an oval shape, a regular polygon shape, an irregular polygon shape, a pentagon shape, a hexagon shape, a heptagon, and an octagon shape. Further according to another embodiment, the method further includes cutting along a second subset of sides of a second region on the planar disc, wherein at least one of the plurality of second sides of the second region is uncut and integrally connected to the planar disc, and pressing a second textured feature into the second region.

According to another embodiment, the first region and the second region have different shapes, or alternatively the first region and the second region have a same shape.

According to one or more embodiment, there is provided a method of using a thrust disc for an aircraft. The method includes providing a thrust input; and engaging the thrust disc based on the provided thrust input. The thrust disc includes a planar body; and a region unitarily formed from a portion of the body. The region has a plurality of sides defining the region on the planar body. Further, the region has a textured feature. Also, a subset of the plurality of sides are cut and at least one of the plurality of sides is integrally connected to the body. Further, according to another embodiment, the thrust disc includes a plurality of regions formed from a plurality of different portions of the planar body.

One or more embodiments as disclosed here in may improve manufacturability and lower part cost. Further, a thrust bearing comprised of a disc and bump foil set would significantly reduce processing time and part cost. This could also reduce fixturing used to locate subsequent details, ie the top foil, on the thrust disc. One or more embodiments may also reduce the risk of machine failure due to thrust disc warpage and weld expulsion.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Accordingly, the present disclosure is not to be seen as limited by the foregoing description, but is only limited by the scope of the appended claims.

What is claimed is:

1. A thrust disc for an aircraft, the thrust disc comprising:
 a planar body; and
 a region unitarily formed from a portion of the body,
 wherein the region has a plurality of sides defining the region on the planar body,
 wherein the region has a textured feature, and
 wherein a subset of the plurality of sides are cut and at least one of the plurality of sides is integrally connected to the body;
 wherein the thrust disc further comprises:
 a plurality of regions formed from a plurality of different portions of the body, wherein the plurality of regions each have a textured feature and wherein the each of the plurality of regions has a different shape.

2. The thrust disc of claim 1, wherein the textured feature is corrugated.

3. The thrust disc of claim 1, wherein the textured feature is one selected from a group consisting of a symmetrical bump pattern, an asymmetric bump pattern, and a wrinkled pattern.

4. The thrust disc of claim 1, wherein the region is a trapezoid, wherein the parallel sides of the trapezoid are curved, and wherein at least one of the non-parallel sides is integrally connected to the body.

5. The thrust disc of claim 1, wherein the region is one selected from a group consisting of a triangular shape, a crescent shape, a rectangular shape, a kite shape, a regular polygon shape, and an irregular polygon shape.

6. A thrust disc for an aircraft, the thrust disc comprising:
 a planar body; and
 a region unitarily formed from a portion of the body,
 wherein the region has a plurality of sides defining the region on the planar body,
 wherein the region has a textured feature, and
 wherein a subset of the plurality of sides are cut and at least one of the plurality of sides is integrally connected to the body;
 wherein the thrust disc further comprises:
 a plurality of regions formed from a plurality of different portions of the body, wherein the plurality of regions each have a textured feature and wherein each of the plurality of regions has a different textured feature.

7. The thrust disc of claim 6, wherein the textured feature is corrugated.

8. The thrust disc of claim 6, wherein the textured feature is one selected from a group consisting of a symmetrical bump pattern, an asymmetric bump pattern, and a wrinkled pattern.

9. The thrust disc of claim 6, wherein the region is a trapezoid, wherein the parallel sides of the trapezoid are curved, and wherein at least one of the non-parallel sides is integrally connected to the body.

10. The thrust disc of claim 6, wherein the region is one selected from a group consisting of a triangular shape, a crescent shape, a rectangular shape, a kite shape, a regular polygon shape, and an irregular polygon shape.

11. A method of manufacturing a thrust disc, the method comprising:
 providing a planar disc;
 cutting along a subset of sides of a region on the planar disc, wherein at least one of the plurality of sides of the region is uncut and integrally connected to the planar disc;
 pressing a textured feature into the region;
 cutting along a second subset of sides of a second region on the planar disc, wherein at least one of the plurality of second sides of the second region is uncut and integrally connected to the planar disc; and
 pressing a second textured feature into the second region;
 wherein the first region and the second region have a same shape.

12. The method of claim 11, wherein pressing the textured feature into the region further comprising:
 pressing a corrugated pattern into the region using a hydraulic press.

13. The method of claim 11, wherein pressing the textured feature into the region further comprising:
 selecting the textured feature from a group consisting of a symmetrical bump pattern, an asymmetric bump pattern, and a wrinkled pattern; and
 pressing the selected textured feature into the region using a hydraulic press.

14. The method of claim 11, wherein cutting further comprises:
 cutting to form a trapezoid by cutting the curved parallel sides and at least one of the non-parallel sides.

15. The method of claim 11, wherein cutting further comprises:
 cutting to form one selected from a group consisting of a triangular shape, a crescent shape, a rectangular shape, a kite shape, a regular polygon shape, and an irregular polygon shape.

* * * * *